(No Model.)
W. BURDIN.
ATTACHMENT FOR MOWERS.
No. 498,205. Patented May 23, 1893.
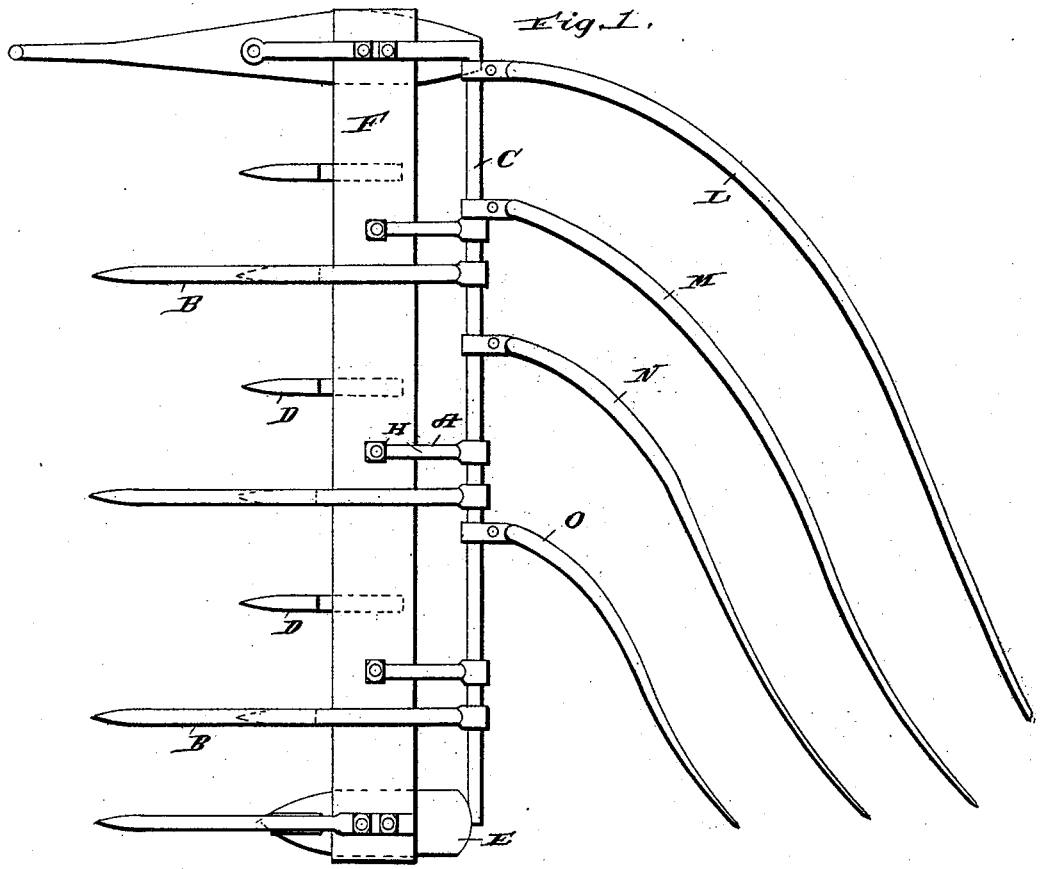
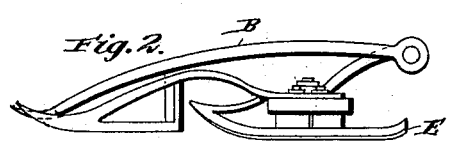
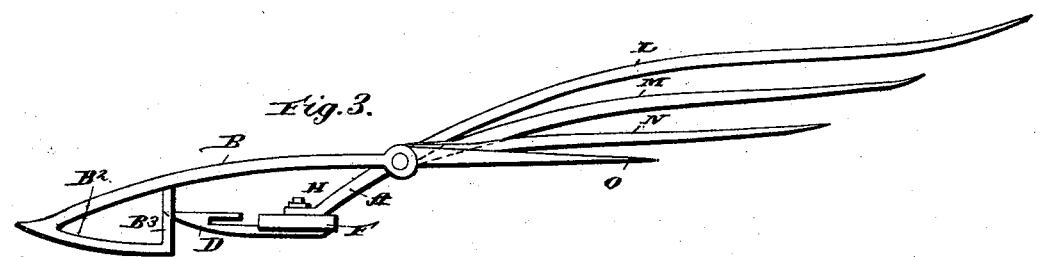
Witnesses:
C. H. Raeder
W. F. Matthews.
Inventor
William Burdin
By James J. Sheehy
Attorney

United States Patent Office.

WILLIAM BURDIN, OF LITTLE BRITAIN, ASSIGNOR OF ONE-HALF TO HUGH A. McLAREN, OF WOLFE ISLAND, CANADA.

ATTACHMENT FOR MOWERS.

SPECIFICATION forming part of Letters Patent No. 498,205, dated May 23, 1893.

Application filed August 21, 1891. Serial No. 403,376. (No model.)

*To all whom it may concern:*

Be it known that I, WILLIAM BURDIN, a citizen of Canada, residing in Little Britain, in the county of Victoria and Province of Ontario, Canada, have invented a certain new and useful Attachment for Mowers, of which the following is a specification, reference being made to the accompanying drawings, in which—

Figure 1 is a plan of a finger-bar portion of a mower machine embodying my invention. Fig. 2 is an elevation showing the end of the finger-bar portion of the mower machine with my invention attached which end is arranged adjacent to and is attached to the wheeled portion of a mower. Fig. 3 is a cross sectional view made by an imaginary vertical plane showing the said finger-bar portion of the mower machine with my new invention attached.

The first part of my invention relates to the combination of the guards and their method of attachment to the finger-bar in such a manner as to admit of the said guards raising the pea vines at a sufficient height from the surface of the ground in order to allow the cutting knife with finger-bar to pass entirely beneath the vines when in the course of operation in severing the said vines from their roots near the surface of the ground. The said guards by their method of attachment in a movable manner will adjust themselves to the physical character of the surface of the ground in order to effectually secure the raising of the said vines so as to guard against any possibility of the cutting knife passing through the vine; the object of this part of my invention is that of time saving, cleanliness in harvesting the peas, and economy in saving the peas that would be otherwise thrashed out of the pods before leaving the fields and thus be lost to the farmer.

The second part of my invention relates to the combination of a swather attached to the finger-bar which in its course through the field receives the vines as they are being cut and deposits the said cut vines in rows at a sufficient distance from the uncut vines to admit of the horses and machine having a clear path on the next trip.

In the drawings, A, A, A, represent the small iron brackets by means of which the round rod C, C, is preferably fixed to the finger-bar F, F, the said iron brackets A, A, A, being firmly attached to the said finger-bar with nuts and bolts H, H, H. The guards B, B, B, are loosely attached to the round rod C, C, so as to admit of them hinging upon said rod C, C, and swinging vertically. The said guards are kept from sliding in a horizontal direction along the rod C, C, by the points of the fingers D, D, D, as will be presently described.

As better illustrated in Fig. 3 of the drawings the guards B, which are disposed forwardly and downwardly, are provided at their forward ends with runners $B^2$, designed to slide over the ground, which runners are preferably formed integral with the guards and have their rear ends connected with said guards by the vertical bars or branches $B^3$. These vertical bars or branches $B^3$, are provided in their rear sides with vertical recesses which are designed to receive the points of the fingers D, whereby it will be seen that the said fingers will prevent lateral play of the guards without interfering with the vertical movement of the same incidental to travel over undulating ground.

The swather consists of rods or fingers O, N, M, L, rigidly fixed to the round rod C, C, each occupying a gradual elevation above the other in an oblique manner the rod O being the lowest and L the highest; each of the said rods is curved as shown in Fig. 1, and preferably tapers off to a point. Fig. 1 shows the plan of the iron rods L, M, N, O, and Fig. 3 shows said rods in elevation. The peas, as they are being cut, will be forced upon the said swather by the forward movement of the mower, and the inclined position of the swather and the curvature of the rods, L, M, N, O, will cause the pea vines to follow the direction of said rods L, M, N, O, and subsequently and effectually deposit the pea vines immediately behind the said wheeled portion of said mower thus rendering the surface of the ground over which the finger-bar had just passed clean and clear of the cut vines for the next trip.

I prefer in practice to connect the swather rods or fingers and the forwardly extending guards to the finger bar through the medium of the rod C, as described, but I do not desire to be confined to such construction as the said rods or fingers as well as the guards may be connected directly to the finger bar or may be connected to said bar through the medium of any approved devices.

I make no claim to the finger-bar F, F, or to the fingers D, for I am aware that these are not new; but

What I claim as my invention, and desire to secure by Letters Patent, is—

1. An attachment to the cutter bar of harvesters, comprising a series of approximately parallel curved rods or fingers of increasing length, the shorter rod or finger being nearly horizontal, and the longer rods or fingers increasing in upward inclination, said rods or fingers terminating in a line about at right angles to the finger bar, substantially as and for the purpose set forth.

2. In a mower attachment, the combination with a finger bar; of the rod C, fixed with respect to the finger bar, and the curved swather rods or fingers O, N, M, L, each being independently and rigidly fixed to the rod C, and each occupying a different plane and extending in an oblique direction; the rod O, being arranged in the lowest plane and the rod L, in the highest plane, substantially as and for the purpose set forth.

Little Britain, July 13, 1891.

WILLIAM BURDIN.

In presence of—
THOMAS H. YEREX,
JAS. W. VALLENTYNE.